March 30, 1948. M. A. G. FABIA 2,438,778
PROGRESSIVE VARIABLE SPEED DEVICE
Filed Dec. 29, 1944
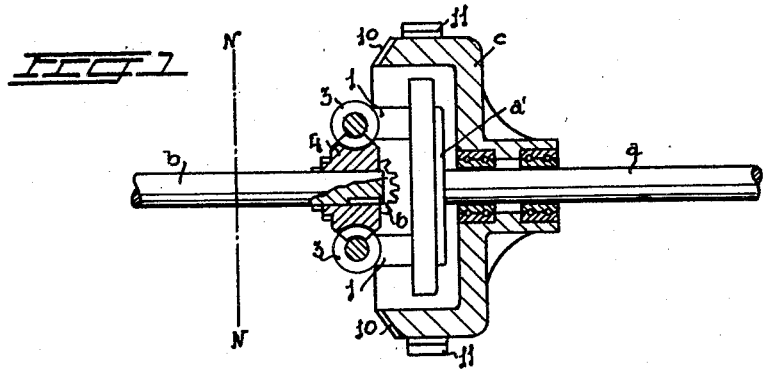
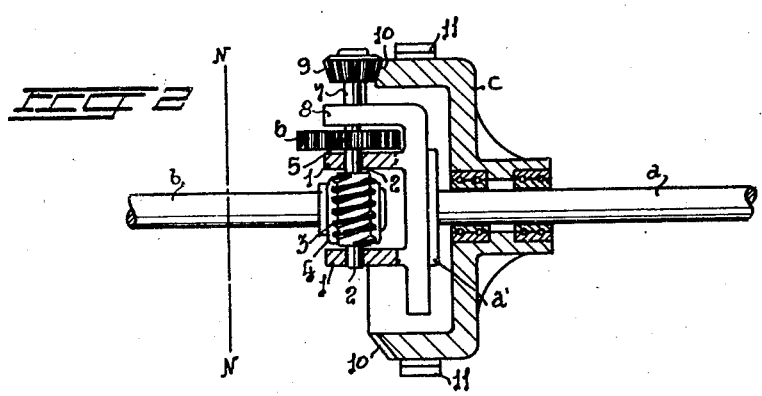
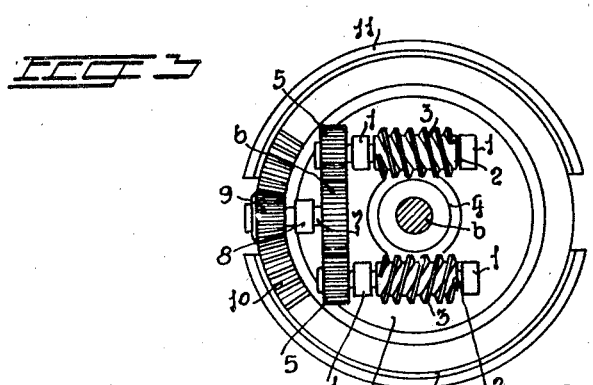
Inventor:
Manuel Andres Gonzalez Fabia
by
Singer, Ehlert, Stern & Carlberg
Attorneys Patented Mar. 30, 1948

2,438,778

UNITED STATES PATENT OFFICE 2,438,778

PROGRESSIVE VARIABLE-SPEED DEVICE

Manuel Andrés González Fabiá, Buenos Aires, Argentina, assignor to Tecnica Industrial y Comercial Sociedad Anonima Tecosa, Buenos Aires, Argentina, a corporation of Argentina Application December 29, 1944, Serial No. 570,304
In Brazil December 29, 1943

3 Claims. (Cl. 74—280)

The present invention relates to a progressive variable speed device, the main object of which is to provide a transmission element of such characteristics that one of the most important problems in modern mechanics will be solved thereby.

The gear changing mechanisms known up to the present moment are generally constituted by differently proportioned parts between the driving element and the driven element, of such a construction that it is impossible to obtain progressive variations in speed. In order to shift from one speed to the next it has been necessary to resort to the use of clutch mechanisms, which leads not only to extraordinary complications in the construction of the mechanisms as a whole, but also in the working of same.

Several types of transmission mechanisms based on pulleys of variable diameters have been put into practice and, although they have undoubtedly led to good results, for certain kinds of drives, their practical application is restricted, since they are only applicable to certain types of machines of reduced power; even so, a good performance from this system of pulleys cannot be obtained because the difference in diameter of said pulleys implies a certain amount of friction which is contrary to mechanical precision.

The progressive variable speed device of the present invention eliminates these disadvantages in such a simple way that its successful application in the various fields, whether in machinery in general or automobiles in particular, may be foreseen. In the latter its application will undoubtedly be very broad.

The present invention deals with an epicyclic train based on the satellite and planetary system, in such a particular manner that its effect depends on the influence of a regulating member upon a combination of gears which create the different variations in speed, not by means of the simple tooth pitch relations between all its members, but by means of worms which may be considered the principal elements of this progressive variable speed device, since their reversible characteristic allows them to act as direct driving means or for regulating the movements according to the pitch.

For this purpose, the driving member ends in a sleeve with bearings for assembling the shafts of a set of worms meshing with corresponding gears secured to the end of the driving shaft, said worms being mechanically coupled to said regulating member, the latter being supplied with means enabling it to follow the rotation of the general assembly, but otherwise combining with resisting elements which, by means of a more or less potent braking action, cause a corresponding restriction in the movement of the regulating member, said restriction being sufficient to exert a greater or minor effect on the mechanism in order that the worms may provoke the rotation of the driven element.

The way in which the epicyclic train combines to perform the transmitting action controlled by the regulating element should be noted. This element, when accompanying the driving member, will not, of course, produce any effect on the variable speed device; but when the freedom of said regulating element is restrained in accordance to the amount of braking action exerted thereon, the speed obtained in the motion transmitted to the driven element will be influenced correspondingly; in this manner it is possible to obtain a progressive and absolute gradual reduction of speed up to a value equal to zero, and since the number of teeth in the regulating element or member is greater than that of the driven member, the action of reducing the movement of the regulating member progresses, and the effect obtained on the driven member is reversed, as a result of which a countermovement is secured which is also a progressive movement which might progress to a limit which is determined by the immobility of said regulating member.

In addition to the objects already mentioned, several other objects are obtained with the present invention, among which attention should be called to the facility of obtaining a drive, controlled either automatically or by hand, which exerts its action strictly in accordance with the requirements of the movements of the regulating member.

Another object of this invention is to replace the old type gearshift mechanism based on abrupt changing of gears and providing instead a progressive variable speed device for automobiles and automotors in general, which is gradual, precise and lacking of high friction.

A further object of this invention is to reduce the gearshift mechanisms and, at the same time, simplify the operation of same, either in automotive vehicles, agricultural machines in general, or any other type of machines which require a variable speed device.

Another object is to avoid ruptures in transmissions and particularly in gearshifts, since this new transmission is provided with means which maintain a permanent meshing of the gears and depends only on the operative influence of the regulating element or member.

Other objects of the present invention will be apparent from the following description, which, for sake of clearness and understanding, has been illustrated with several drawings of the preferred embodiments of this new progressives variable speed device, all of which are only illustrated examples, and in which:

Fig. 1 is a schematic view of the progressive variable speed device, represented in longitudinal section in order to give an idea of the relation of the worms in the motor or driving member with respect to the gear driven member.

Fig. 2 represents the same assembly of Fig. 1, also shown in longitudinal section, but from a different angle, in order to show the location of the worms and their mechanical relation with the regulating member.

Fig. 3 is a view of the progressive variable speed device as represented by a transverse section made through line N—N appearing in the previous figures, and clearly showing the location of the worms which, meshing in the driven member and assembled on the driving member, are mechanically related to the regulating member.

In the different figures the same numbers and letters of reference designate like or corresponding elements or parts throughout the description.

As shown in the drawings, a is the driving rotating member, b is the driven rotating member and c is the regulating rotating member, all of which constitute, in combination, the progressive variable speed device subject of the present invention.

The driving rotating member a terminates in a sleeve a' which, according to the embodiment of Figs. 1, 2 and 3, comprises the bearings 1 whereon the shafts 2 of the corresponding worms 3 are assembled, the threads of the latter being meshed (in this case) directly with the threads of gear 4 affixed to the end of the driven member b which is coaxial with driving member a.

The shafts 2 of said worms 3 terminate with pinions 5 which mesh with spur gear 6, the shaft of which, 7, is also assembled on sleeve a' by means of bearings 8 and, as shown in Figs. 2 and 3, the same shaft 7 has a planetary bevel wheel 9 which meshes in crown wheel 10 of regulating member c. Said crown wheel 10 is concentrically disposed in relation to the shaft that constitutes the driving member a and, therefore, said crown wheel is able to act as a rotating track for the planetary bevel wheel 9.

The regulating member c is assembled on the driving member a, but with no mechanical relation, that is to say, free upon said driving member shaft. But said regulating member is associated with a friction element 11 dependent on the drive of an automatic regulator or manually operated device, according to the application ∶ch the present progressive variable speed device recei˙ ∶s.

In this way, if the friction member 11 leaves the reg‿ting member c free, when the driving me˙ .oer a rotates, the regulating member c is al˙. ˙mpelled to rotate, since it is combined thereto by means of worms 3, and gears 5, 6 and 9, with respect to the crown wheel 10.

V ꞏɛn the present mechanism is not in moveme˙ ⸴, the worms 3, which remain motionless, act as incasement for gear 4, which, by means of driven member b, is forced to rotate together with the driving member a, which implies direct transmission.

Now, if a force capable of reducing the movements of the regulating member c acts on the friction element 11, logically, since said member c cannot follow the revolutions of the driving member a, the difference in speed will engender an action of the crown wheel 10 towards the planetary bevel wheel 9, which, with its shaft 7 and spur gear 6, actuates on the respective pinions 5 of worm 3, so that said worms 3, although assembled on sleeve a' of driving member a, when rotating on their shaft 2, transmit their action to gear 4 of driven member b, as a result of which this member b acts at the same speed as driving member a, less the amount diminished by the contrary effect produced by worms 3, which respond to the reduction of speed produced by the regulating member c.

If the speed of this regulating member c is further reduced, the number of threads which reversely are transmitted by the gears and worms mechanism which subtract speed from member b, will be greater to such an extent, that if the action provokes a reduction equivalent to the number of threads in gear 4, the transmission of the movement of member a will be null. In fact even if the sleeve a' rotates at a certain speed, the worms 3, rotating at the equivalent speed of so many revolutions per rotation of the sleeve as threads comprised by gear 4, neutralize the driving effect and actuate thereby as a perfect disconnecting device.

On the other hand, if the reducing action on friction element 11 is further increased, the speed of the gears and worms mechanism will be greater than the speed corresponding to the number of threads 4 and, consequently, the effect will no longer be null, but will exert its influence on gear 4 in the opposite direction to that of the member a; this means that in said member b a countermovement or reversion in speed will be obtained, which may be gradually increased as the resistance applied on the regulating member c is being increased, said countermovement attaining the maximum speed when the regulating member c reaches absolute immobility.

As previously stated, this progressive variable speed device and reversing mechanism is adaptable to motor vehicles, agricultural machines, elevators and any other machines which require a progressive and gradual action from maximum to neutral and from neutral to a determined countermovement speed.

In résumé, this invention relates to a variable speed device and reversing mechanism consisting in the combination of a driving rotating member a, a driven rotating member b and a regulating rotating member c, wherein the first mentioned member a comprises a sleeve a' where the shafts of a worm are assembled as well as the other elements comprising an epicyclic train, said epicyclic train being related, on the one hand, to a reception element or gear 4 of the driven member b, and on the other hand mechanically related to the regulating member c, which possess graduateable resistance means, ranging from a state of absolute freedom to complete immobility.

From the foregoing it will be apparent to those skilled in the art that, on carrying the present invention into practice, minor variations may be introduced as regards the construction and appearance of the progressive variable speed device described, without departing from the spirit and scope of this invention as clearly defined in the appended claims.

I claim:
1. In a progressively variable speed transmission, the combination of axially alined driven and driving shafts, a cup-shaped member fixedly secured to said driving shaft, a pair of shafts arranged with their axes parallel to each other and rotatably supported in spaced bearings provided in said cup-shaped member, a worm fixedly mounted on each said last named shafts between said spaced bearings, a worm gear fixedly mounted on said driven shaft and meshing with both said worms, a spur gear fixed to one end of each said worm carrying shafts, a radial shaft rotatably mounted on said cup-shaped member and having a spur gear fixed to its inner end meshing with both said spur gears on said worm carrying shafts, a bevel gear fixed to the outer end of said radial shaft, and a rotatable speed regulating member rotatably supported on the driving shaft and provided with an axially extending flange forming an annular chamber within which is located said cup-shaped member, the outer circumference of said flange forming a braking surface, and manually operable means engaging said braking surface, the outer edge of said flange being provided with gear teeth meshing with said bevel gear on the outer end of said radial shaft.

2. In a progressively variable speed transmission, the combination of axially alined driven and driving shafts, a cup-shaped member fixedly secured to said driving shaft, a pair of shafts arranged with their axes parallel to each other and rotatably supported in spaced bearings provided in said cup-shaped member, a worm fixedly mounted on each said last named shafts between said spaced bearings, a worm gear fixedly mounted on said driven shaft and meshing with both said worms, a spur gear fixed to one end of each said worm carrying shafts, a radial shaft rotatably mounted on said cup-shaped member and having a spur gear fixed to its inner end meshing with both said spur gears on said worm carrying shafts, a bevel gear fixed to the outer end of said radial shaft, and a rotatable speed regulating member rotatably supported on one of said axially alined shafts and provided with an axially extending flange forming an annular chamber within which is located said cup-shaped member, the outer circumference of said flange forming a braking surface, and manually operable means engaging said braking surface, the outer edge of said flange being provided with gear teeth meshing with said bevel gear on the outer end of said radial shaft.

3. In a progressively variable speed transmission, the combination of axially alined driven and driving shafts, a cup-shaped member fixedly secured to said driving shaft, a pair of shafts arranged with their axes parallel to each other and rotatably supported in spaced bearings provided in said cup-shaped member, a worm fixedly mounted on each said last named shafts between said spaced bearings, a worm gear fixedly mounted on said driven shaft and meshing with both said worms, a gear fixed on one end of each said worm carrying shafts, a radial shaft rotatably mounted on said cup-shaped member, about an axis parallel to the axes of said worm carrying shaft, said radial shaft having a gear fixed to its inner end meshing with both said gears on said worm carrying shafts, a bevel gear fixed to the outer end of said radial shaft, a rotatable speed regulating member provided with a circumferential braking surface rotatably supported on one of said axially alined shafts and surrounding said cup-shaped member on said driving shaft, said speed regulating member being provided with gear teeth meshing with said bevel gear on said radial shaft, and manually operable means for engaging and braking said rotatable speed regulating member.

MANUEL ANDRÉS GONZÁLEZ FABIÁ.

REFERENCES CITED

The following references are of record in the file of this patent:

UNITED STATES PATENTS

| Number | Name | Date |
|---|---|---|
| 1,564,318 | Bower | Dec. 8, 1925 |
| 1,895,888 | Lotts | Jan. 31, 1933 |

FOREIGN PATENTS

| Number | Country | Date |
|---|---|---|
| 119,945 | Great Britain | Oct. 24, 1918 |
| 396,138 | France | Jan. 16, 1908 |
| 534,517 | France | Mar. 28, 1922 |
| 574,856 | France | Apr. 9, 1924 |
| 618,015 | Germany | Sept. 2, 1935 |